US010070219B2

(12) United States Patent
Huang

(10) Patent No.: US 10,070,219 B2
(45) Date of Patent: Sep. 4, 2018

(54) SOUND FEEDBACK DETECTION METHOD AND DEVICE

(71) Applicant: Hytera Communications Corp., Ltd., Shenzhen, Guangdong (CN)

(72) Inventor: Ni Huang, Guangdong (CN)

(73) Assignee: Hytera Communications Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 15/538,625

(22) PCT Filed: Dec. 24, 2014

(86) PCT No.: PCT/CN2014/094775
§ 371 (c)(1),
(2) Date: Jun. 21, 2017

(87) PCT Pub. No.: WO2016/101162
PCT Pub. Date: Jun. 30, 2016

(65) Prior Publication Data
US 2017/0353792 A1 Dec. 7, 2017

(51) Int. Cl.
*H04B 15/00* (2006.01)
*H04R 3/02* (2006.01)

(52) U.S. Cl.
CPC ......... *H04R 3/02* (2013.01); *G10H 2250/235* (2013.01)

(58) Field of Classification Search
CPC ........................... H04R 3/005; H04R 2410/01; H04R 2410/07; H04R 1/326; H04R 2430/20; H04R 2430/21; H04R 2430/23; H04R 25/407; H04R 3/02; H04R 3/04; H04R 25/453; H04S 2400/13; H04S 7/00;
(Continued)

(56) References Cited

U.S. PATENT DOCUMENTS 5,442,712 A * 8/1995 Kawamura .............. H04R 3/02 381/83
8,428,274 B2 4/2013 Shiraishi et al.
(Continued)

FOREIGN PATENT DOCUMENTS

CN 1398054 A 2/2003
CN 101621730 B 5/2013
(Continued)

OTHER PUBLICATIONS

PCT/CN2014/094775, Sep. 23, 2015, International Search Report.
(Continued)

*Primary Examiner* — Lun-See Lao
(74) *Attorney, Agent, or Firm* — Wolf, Greenfield & Sacks, P.C.

(57) ABSTRACT

An acoustic feedback detection method and device. According to the method, whether acoustic feedback occurs is determined based on a frequency characteristic of an acoustic feedback signal. Specifically, a judgment value is determined using a power peak value and an average peak value, and it is determined whether acoustic feedback occurs in a signal based on a magnitude of the judgment value and a duration of the power peak value. In this case, whether acoustic feedback occurs can be determined based on the frequency characteristic of the signal.

17 Claims, 7 Drawing Sheets

(58) Field of Classification Search

CPC ........... H04B 3/23; H04L 2025/03687; H04M 3/002; H04M 9/08

USPC ... 381/83, 93, 104–106, 312, 315, 317, 318, 381/57, 60, 71.8

See application file for complete search history.

(56) References Cited

U.S. PATENT DOCUMENTS

| | | | | |
|---|---|---|---|---|
| 8,675,901 | B2 * | 3/2014 | Kojima | H04R 25/453 381/317 |
| 2003/0012388 | A1 * | 1/2003 | Ura | H04R 3/02 381/66 |
| 2009/0067644 | A1 * | 3/2009 | Crockett | H04S 7/00 381/98 |
| 2013/0156205 | A1 | 6/2013 | Ura | |

FOREIGN PATENT DOCUMENTS

| | | | |
|---|---|---|---|
| CN | 103081511 | A | 5/2013 |
| CN | 104464752 | A | 3/2015 |
| EP | 1 725 069 | A1 | 11/2006 |

OTHER PUBLICATIONS

EP 14908730.6, Oct. 6, 2017, Extended European Search Report.

International Search Report for Application No. PCT/CN2014/094775 dated Sep. 23, 2015.

Extended European Search Report for Application No. 14908730.6 dated Oct. 6, 2017.

* cited by examiner

SOUND FEEDBACK DETECTION METHOD AND DEVICE

CROSS-REFERENCE TO RELATED APPLICATION

The present application is the National Stage of PCT international patent application No. PCT/CN2014/094775 filed on Dec. 24, 2014, the entire contents of which is incorporated herein by reference.

FIELD

The disclosure relates to the field of wireless communication, and in particular to an acoustic feedback detection method and an acoustic feedback detection device.

BACKGROUND

Acoustic feedback is a phenomenon that sound from a speaker is fed back to a microphone via a feedback path and is picked up by the microphone. The existence of the acoustic feedback adversely affects the sound field frequency response characteristic, and serious acoustic feedback may cause a shrill squeal, which seriously deteriorates the sound quality.

In order to suppress acoustic feedback, the following technical solution is adopted in the conventional technology. As disclosed in APPARATUS AND METHOD FOR DETECTING ACOUSTIC FEEDBACK, it is provided an apparatus which includes: a first level detecting section configured to detect a signal level of sound signals obtained from a position in a sound-signal system in which a microphone and speaker are connected; a first extracting section configured to extract, from the sound signals of which the signal level is detected, signals in a band having a bandwidth predetermined for each of at least one predetermined center frequency; a second level detecting section configured to detect a signal level of the signals in each band, the signals being extracted by the first extracting section; and a determining section configured to determine whether or not acoustic feedback is occurring, on the basis of a threshold determined according to the signal level detected by the first level detecting section and a waveform of each signal level detected by the second level detecting section.

In the above conventional technical solution, the first extracting section is implemented by multiple band-pass filters, which cannot cover the full frequency band due to the limitation in the center frequency and the bandwidth of the band-pass filter, thus the problem of missing of detection may occur. In addition, whether acoustic feedback occurs is determined by judging whether the waveform of the signal level is a sinusoidal periodic waveform, which may cause the problem of false detection.

SUMMARY

In view of this, it is an object of the present disclosure to provide an acoustic feedback detection method and an acoustic feedback detection device, in order to solve the problem of missing of detection and false detection caused by a wide-band filter and the acoustic feedback detection based on the signal waveform, thereby improving the accuracy and reliability of acoustic feedback detection.

In a first aspect of the present disclosure, it is provided an acoustic feedback detection method, which includes:

performing time-frequency conversion on a received time-domain signal to acquire a corresponding frequency-domain signal;

determining a power peak value based on the frequency-domain signal, and calculating a power sum value of multiple points around the power peak value and an average power value of the frequency-domain signal;

determining a judgment value based on the power sum value and the average power value;

determining a corresponding preset first threshold based on a frequency band range into which a frequency corresponding to the power peak value falls, and determining that the judgment value is a to-be-counted judgment value corresponding to the frequency band range in a case that the judgment value is greater than the preset first threshold; and counting the number of to-be-counted judgment values corresponding to the frequency band range within a preset time period and determining a repetition duration of the power peak value which falls into the frequency band range within a preset time period; and determining that acoustic feedback occurs in a case that the number is greater than a preset second threshold or the repetition duration is greater than a preset third threshold.

Preferably, after determining that the acoustic feedback occurs, the method further includes:

attenuating the time-domain signal in a manner that a gain coefficient gradually decreases to a target value, to acquire an acoustic-feedback suppressed signal.

Preferably, the method further includes:

identifying whether an amplitude of the time-domain signal is less than a preset fourth threshold; and attenuating the signal of which the amplitude is less than the preset fourth threshold, to acquire a small signal attenuated time-domain signal, and where attenuating the time-domain signal in a manner that a gain coefficient gradually decreases to a target value, to acquire an acoustic-feedback suppressed signal includes:

attenuating the small signal attenuated time-domain signal in a manner that the gain coefficient gradually decreases to the target value, to acquire the acoustic-feedback suppressed signal.

Preferably, it is determined that acoustic feedback does not occur in a case that the number is less than or equal to the preset second threshold and the repetition duration is less than or equal to the preset third threshold, and the method further includes:

calculating a maximum likelihood ratio of a voice frame based on the time-domain signal and a noise power value, and determining that the time-domain signal is a voice signal in a case that the maximum likelihood ratio is greater than a preset voice threshold; and enhancing the voice signal in a manner that a gain coefficient gradually increases to 0 dB, to acquire an enhanced signal.

Preferably, the determining the judgment value based on the power sum value and the average power value includes:

calculating a ratio between the power sum value and the average power value as the judgment value.

Preferably, the determining the power peak value based on the frequency-domain signal, and calculating the power sum value of the multiple points around the power peak value and the average power value of the frequency-domain signal includes:

calculating a sum value of the multiple points around the power peak value according to an equation $$\text{Peak} = \sum_{j=-k}^{k} X\max(j),$$

where X max(0) is the power peak value, and X max(j) represents the multiple points around the power peak value in a case that j is not equal to 0, with k being greater than or equal to 1; and calculating the average power value according to an equation $$Pav = \left[\sum_{j=0}^{N/2-1} Xj - \sum_{j=-k}^{k} X\max(j)\right] \bigg/ \left(\frac{N}{2} - 2k - 1\right), \text{ where } \sum_{j=0}^{N/2-1} Xj$$

represents a sum value of all power values of a power spectrum of the frequency-domain signal.

In a second aspect of the present disclosure, it is provided an acoustic feedback detection device, which includes:

a time-frequency conversion unit, configured to perform time-frequency conversion on a received time-domain signal to acquire a corresponding frequency-domain signal;

a calculation unit, configured to determine a power peak value based on the frequency-domain signal, and calculate a power sum value of multiple points around the power peak value and an average power value of the frequency-domain signal;

a judgment value determination unit, configured to determine a judgment value based on the power sum value and the average power value;

a to-be-counted judgment value determination unit, configured to determine a corresponding preset first threshold based on a frequency band range into which a frequency corresponding to the power peak value falls, and determine that the judgment value is a to-be-counted judgment value corresponding to the frequency band range in a case that the judgment value is greater than the preset first threshold; and an acoustic feedback determination unit, configured to count the number of to-be-counted judgment values corresponding to the frequency band range within a preset time period and determine a repetition duration of the power peak value which falls into the frequency band range within a preset time period; and determine that acoustic feedback occurs in a case that the number is greater than a preset second threshold or the repetition duration is greater than a preset third threshold.

Preferably, the device further includes:

a suppression unit, configured to attenuate the time-domain signal in a manner that a gain coefficient gradually decreases to a target value, to acquire an acoustic-feedback suppressed signal.

Preferably, the device further includes:

an identification unit, configured to identify whether an amplitude of the time-domain signal is less than a preset fourth threshold;

a small signal attenuation unit, configured to attenuate the signal of which the amplitude is less than the preset fourth threshold, to acquire a small signal attenuated time-domain signal; and a suppression unit, configured to attenuate the small signal attenuated time-domain signal in a manner that a gain coefficient gradually decreases to a target value, to acquire a acoustic-feedback suppressed signal.

Preferably, the device further includes:

a voice determination unit, configured to calculate a maximum likelihood ratio of a voice frame based on the time-domain signal and a noise power value, and determine that the time-domain signal is a voice signal in a case that the maximum likelihood ratio is greater than a preset voice threshold; and a voice enhancement unit, configured to enhance the voice signal in a manner that a gain coefficient gradually increases to 0 dB, to acquire an enhanced signal.

Preferably, the judgment value determination unit may be configured to calculate a ratio between the power sum value and the average power value as the judgment value.

Preferably, the calculation unit includes:

a sum value calculation subunit, configured to calculate a sum value of the multiple points around the power peak value according to an equation $$\text{Peak} = \sum_{j=-k}^{k} X\max(j),$$

where

X max(0) is the power peak value, and X max(j) represents the multiple points around the power peak value in a case that j is not equal to 0, with k being greater than or equal to 1; and an average power value calculation subunit, configured to calculate the average power value according to an equation $$Pav = \left[\sum_{j=0}^{N/2-1} Xj - \sum_{j=-k}^{k} X\max(j)\right] \bigg/ \left(\frac{N}{2} - 2k - 1\right), \text{ where } \sum_{j=0}^{N/2-1} Xj$$

represents a sum value of all power values of a power spectrum of the frequency-domain signal.

In a third aspect of the present disclosure, it is provided an acoustic feedback detection device, which includes at least one processor, at least one network interface or other communication interface, a storage and at least one communication bus, where the storage is configured to store program instructions, and the processor is configured to, according to the program instructions:

perform time-frequency conversion on a received time-domain signal to acquire a corresponding frequency-domain signal;

determine a power peak value based on the frequency-domain signal, and calculate a power sum value of multiple points around the power peak value and an average power value of the frequency-domain signal;

determine a judgment value based on the power sum value and the average power value;

determine a corresponding preset first threshold based on a frequency band range into which a frequency corresponding to the power peak value falls, and determine that the judgment value is a to-be-counted judgment value corresponding to the frequency band range in a case that the judgment value is greater than the preset first threshold; and count the number of to-be-counted judgment values corresponding to the frequency band range within a preset time period and determine a repetition duration of the power peak value which falls into the frequency band range within a preset time period; and determine that acoustic feedback occurs in a case that the number is greater than a preset second threshold or the repetition duration is greater than a preset third threshold.

As can be seen from the above technical solution, it is disclosed by the present disclosure that, whether acoustic feedback occurs is determined based on the frequency characteristic of the acoustic feedback signal. Specifically, the judgment value is determined using the power peak value and the average peak value, and it is determined whether acoustic feedback occurs in the signal based on the magnitude of the judgment value and the duration of the power peak value. In this case, whether acoustic feedback occurs can be determined based on the frequency characteristic of the signal without filtering processing of a band-pass filter and detection of the periodicity of the signal waveform, thus the problem of missing of detection and false detection can be avoided, and the accuracy and reliability of acoustic feedback detection can be improved.

BRIEF DESCRIPTION OF THE DRAWINGS

The drawings to be used in the description of the embodiments of the application or the conventional technology will be described briefly as follows, so that the technical solutions according to the embodiments of the present application or according to the conventional technology will become clearer. It is apparent that the drawings in the following description only illustrate some embodiments of the present application. For those skilled in the art, other drawings may be obtained according to these drawings without any creative work.

DETAILED DESCRIPTION OF THE EMBODIMENTS

In order to provide a better understanding of solutions according to the embodiments of the present disclosure by those skilled in the art, the embodiments of the present disclosure are described in further detail with reference to the accompanying drawings and embodiments.

Embodiment 1

Figure 1:
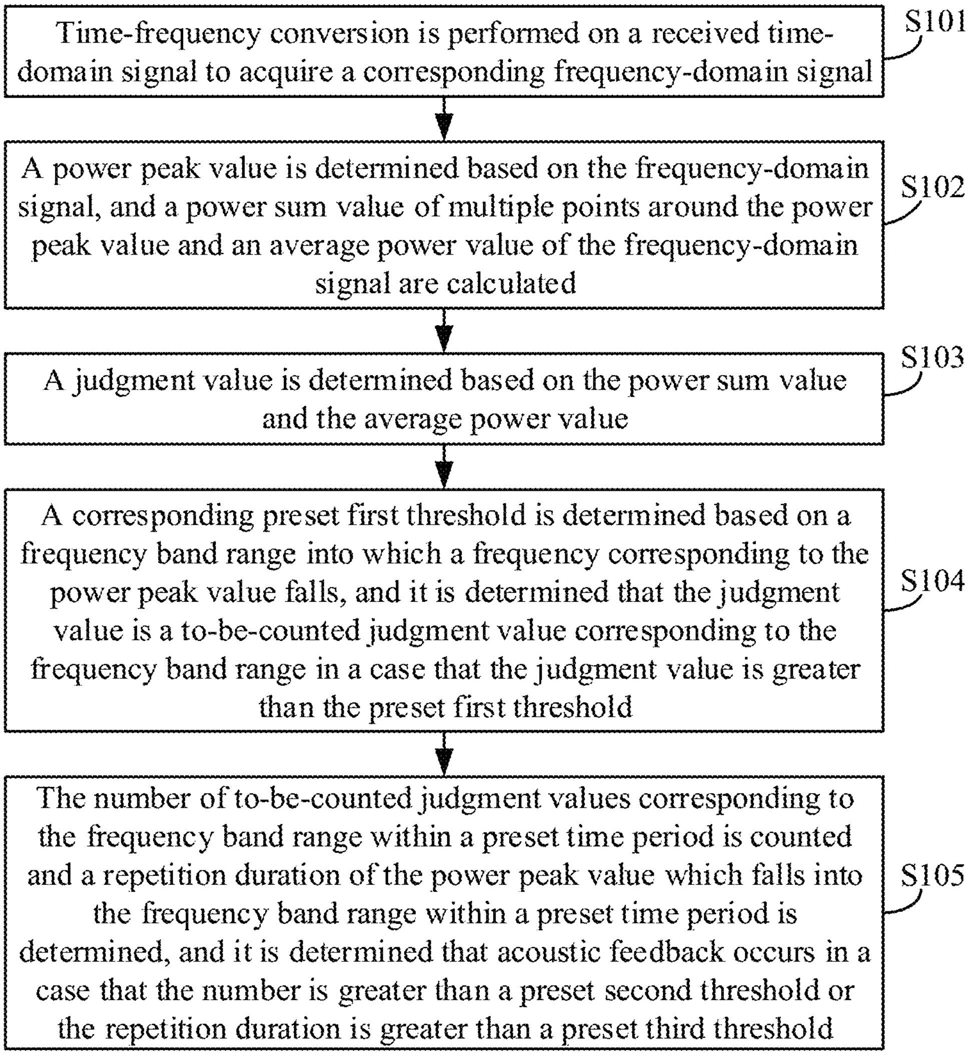
FIG. 1 is a flow chart of an acoustic feedback detection method embodiment 1 according to the present disclosure.

Reference is made to FIG. 1, which is a flow chart of an acoustic feedback detection method embodiment 1 according the present disclosure. The method may include the following steps S101 to S105.

In step S101, time-frequency conversion is performed on a received time-domain signal to acquire a corresponding frequency-domain signal.

The technical solution of the present disclosure is mainly applied to professional wireless communication audio equipment such as a mobile phone and an interphone. The contents of the present disclosure are explained by taking the interphone as an example.

When an interphone receives a signal transmitted by another interphone, the interphone first divides the signal into frames, where all processing and programs are performed frame by frame. Then, each frame of the received signal is windowed and transformed into the frequency domain using an FFT. Thus, a frequency-domain signal corresponding to each frame of time-domain signal can be acquired.

In step S102, a power peak value is determined based on the frequency-domain signal, and a power sum value of multiple points around the power peak value and an average power value of the frequency-domain signal are calculated.

In the embodiment of the present disclosure, step S102 may be performed in the following manner, which includes:

calculating a sum value of the multiple points around the power peak value according to an equation $$\text{Peak} = \sum_{j=-k}^{k} X\max(j),$$

where X max(0) is the power peak value in the power spectrum, and X max(j) represents the multiple points around the power peak value in a case that j is not equal to 0, with k being greater than or equal to 1; and calculating the average power value according to an equation $$Pav = \left[\sum_{j=0}^{N/2-1} Xj - \sum_{j=-k}^{k} X\max(j)\right] \Big/ \left(\frac{N}{2} - 2k - 1\right), \text{ where } \sum_{j=0}^{N/2-1} Xj$$

represents a sum value of all power values of a power spectrum.

In a specific implementation, the average power value may also be calculated according to an equation $$Pav = \left[\sum_{j=0}^{N/2-1} Xj\right] \Big/ \frac{N}{2}.$$

In specific implementations, the number of points around the power peak value to be calculated varies depending on the frequency characteristic of the device. That is, for different devices, values of k in the above equation may be different.

In step S103, a judgment value is determined based on the power sum value and the average power value.

In a specific implementation, step S103 may be implemented in the following manner: calculating a ratio between the power sum value and the average power value as the judgment value.

In step S104, a corresponding preset first threshold is determined based on a frequency band range into which a frequency corresponding to the power peak value falls, and it is determined that the judgment value is a to-be-counted judgment value corresponding to the frequency band range in a case that the judgment value is greater than the preset first threshold.

In specific implementations, the device determines a frequency band in which acoustic feedback occurs and a corresponding first threshold in advance based on the frequency response characteristic of the device. It is to be noted that, the device is required to divide the full frequency band into multiple frequency bands, and determine the frequency band susceptible to acoustic feedback and the corresponding first threshold.

For example, an interphone divides the full frequency band into three portions according to the frequency response characteristic of the interphone, and determines first thresholds respectively corresponding to the three frequency bands. The three portions include:

a first portion: the frequency band range (2400 Hz to 3700 Hz), the judgment value R>first threshold Thresh1, the duration of the peak value Tr>200 ms;

a second portion: the frequency band range (1200 Hz to 1800 Hz), the judgment value R>first threshold Thresh2, the duration of the peak value Tr>240 ms; and a third portion: the frequency band range (other frequency bands), the judgment value R>first threshold Thresh3, the duration of the peak value Tr>300 ms.

In the following, step S104 is further explained by taking the above interphone as an example.

A frequency corresponding to the power peak value determined in the above step S102 can be acquired, and a frequency band range into which the frequency corresponding to the power peak value falls is determined based on the frequency corresponding to the power peak value. Then, a corresponding first threshold is determined based on the frequency band range into which the frequency corresponding to the power peak value falls. Finally, it is determined whether the judgment value is a to-be-counted judgment value corresponding to a certain frequency band range.

It is assumed that the frequency corresponding to the power peak value is 2600 Hz and falls into the first portion of frequency band range (2400 Hz to 3700 Hz), and the corresponding first threshold is Thresh1. Then, it is determined whether the judgment value determined in step S103 is greater than Thresh1, and it is determined that this judgment value is the to-be-counted judgment value corresponding to the first portion of frequency band 2400 Hz to 3700 Hz in a case that the judgment value is greater than Thresh1.

It is assumed that the power peak value is 1600 Hz and falls into the second portion of frequency band range (1200 Hz to 1800 Hz), and the corresponding first threshold is Thresh2. Then, it is determined whether the judgment value determined in step S103 is greater than Thresh2, and it is determined that this judgment value is the to-be-counted judgment value corresponding to the second portion of frequency band 2400 Hz to 3700 Hz in a case that the judgment value is greater than Thresh2.

It is assumed that the power peak value is 1000 Hz and falls into the third portion of frequency band range (other frequency bands), and the corresponding first threshold is Thresh3. Then, it is determined whether the judgment value determined in step S103 is greater than Thresh3, and it is determined that this judgment value is the to-be-counted judgment value corresponding to the third portion of frequency band range in a case that the judgment value is greater than Thresh3.

In step S105, the number of to-be-counted judgment values corresponding to the frequency band range within a preset time period is counted and a repetition duration of the power peak value which falls into the frequency band range within a preset time period is determined, and it is determined that acoustic feedback occurs in a case that the number is greater than a preset second threshold or the repetition duration is greater than a preset third threshold.

In specific implementations, in addition to the first threshold corresponding to each frequency band, the device also needs to set the second threshold and the third threshold corresponding to each frequency band. In a specific implementation of step S105, the number of the to-be-counted judgment values corresponding to the frequency band range determined in step S104 needs to be counted, and the repetition duration of the power peak value which falls into this frequency band range needs to be determined. Finally, a further determination is performed for the preset second threshold and the preset third threshold corresponding to this frequency band. It is determined that acoustic feedback occurs in a case that the number is greater than the preset second threshold or the repetition duration is greater than the preset third threshold.

In the present disclosure, the frequency band range in which the frequency corresponding to the power peak value falls is used as an important basis for acoustic feedback detection, where division of the frequency band range is based on the full frequency band. Therefore, it is not necessary to use the band-pass filter to detect signals, and the problem of missing of detection due to settings of the center frequency and the bandwidth of the band-pass filter can be avoided. In addition, in the present disclosure, the repetition duration of the frequency corresponding to the peak value and the number of the judgment values which meets the condition are used to determine whether the signal is an acoustic feedback signal from the perspective of the frequency characteristic of acoustic feedback, rather than determining the periodicity of the signal from the perspective of the signal waveform, and both values can be acquired by simple calculation procedures which are less error-prone, thereby avoiding the problem of false detection caused by the determination based on the waveform.

Embodiment 2

Figure 2:
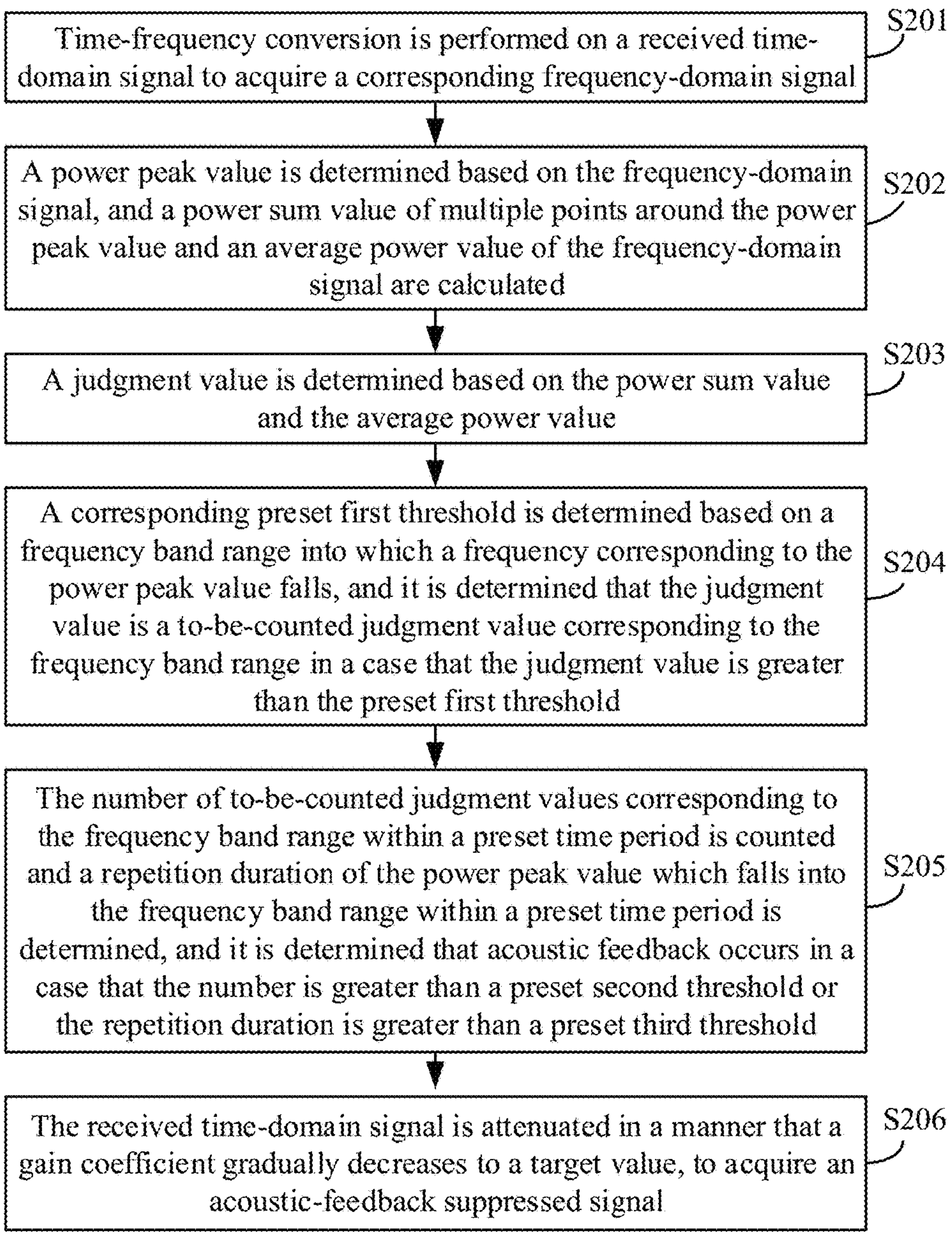
FIG. 2 is a flow chart of an acoustic feedback detection method embodiment 2 according to the present disclosure.

Reference is made to FIG. 2, which illustrates a flow chart of an acoustic feedback detection method embodiment 2 according to the present disclosure. In this method, acoustic feedback suppression is additionally provided on the basis of the above embodiment 1, in order to suppress acoustic feedback and improve the voice quality. The method includes the following steps S201 to S206.

In step S201, time-frequency conversion is performed on a received time-domain signal to acquire a corresponding frequency-domain signal.

In step S202, a power peak value is determined based on the frequency-domain signal, and a power sum value of multiple points around the power peak value and an average power value of the frequency-domain signal are calculated.

In step S203, a judgment value is determined based on the power sum value and the average power value.

In step S204, a corresponding preset first threshold is determined based on a frequency band range into which a frequency corresponding to the power peak value falls, and it is determined that the judgment value is a to-be-counted judgment value corresponding to the frequency band range in a case that the judgment value is greater than the preset first threshold.

In step S205, the number of to-be-counted judgment values corresponding to the frequency band range within a preset time period is counted and a repetition duration of the power peak value which falls into the frequency band range within a preset time period is determined, and it is determined that acoustic feedback occurs in a case that the number is greater than a preset second threshold or the repetition duration is greater than a preset third threshold.

Steps S201 to S205 are the same as steps S101 to S105 described in the above embodiment 1, and are not repeated here.

In step S206, the received time-domain signal is attenuated in a manner that a gain coefficient gradually decreases to a target value, to acquire an acoustic-feedback suppressed signal.

The target value indicates a target safety critical gain, which may be acquired by the device performing tests in advance and at which it is ensured that the acoustic feedback is not generated in the device.

In specific implementations, the device may preset a decrease rate Vdown dB/s of the gain coefficient. The gain coefficient may decrease from 0 dB at a decrease rate of Vdown until the gain coefficient reaches the target value. Different devices have different values for Vdown, but Vdown must be less than zero.

The above S206 is a processing for perform acoustic feedback suppression on the signal in a case that the acoustic feedback occurs in the signal. However, in actual applications, good restoration of the voice signal is required after the acoustic feedback stop occurring, in order to avoid the problem of sudden change in the voice and poor voice quality, thereby improving the voice experience of the user.

In order to avoid the above problem regarding the voice, a preferred embodiment is further provided according to the present disclosure. In the preferred embodiment, a voice enhancement processing is additionally provided on the basis of the above embodiment 2, which is described in detail in the following. In a case of determining that acoustic feedback does not occur in a case that the number is less than or equal to the preset second threshold and the repetition duration is less than or equal to the preset third threshold, the above method further include:

calculating a maximum likelihood ratio of a voice frame based on the time-domain signal and a noise power value, and determining that the time-domain signal is a voice signal in a case that the maximum likelihood ratio is greater than a preset voice threshold; and enhancing the voice signal in a manner that a gain coefficient gradually increases to 0 dB, to acquire an enhanced signal.

Figure 3:
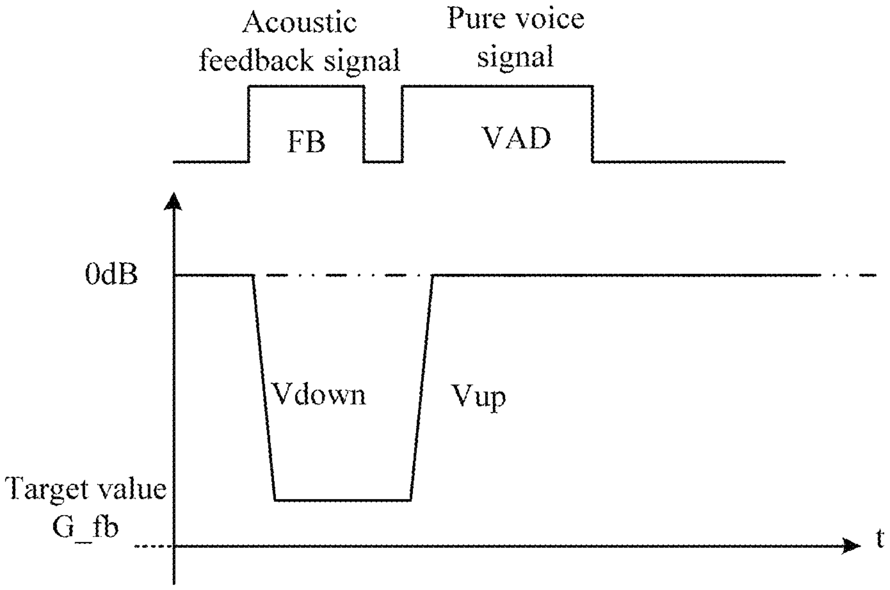
FIG. 3 illustrates an acoustic feedback automatic gain and rate control according to the present disclosure.

Reference is made to FIG. 3, which illustrates an acoustic feedback automatic gain and rate control. In FIG. 3, the decrease rate Vdown dB/s is the gain decrease rate for acoustic feedback suppression, the increase Vup DB/s is the gain increase rate for voice gain compensation. In specific implementation, the device may set the increase rate Vup and Vdown of the gain coefficient in advance. In a case that acoustic feedback occurs in a signal, the device changes the gain coefficient from 0 dB at the decrease rate Vdown dB/s until the gain coefficient reaches the target value, and suppresses the acoustic feedback signal in a manner that the gain coefficient changes. After that, when it is detected that no acoustic feedback occurs, that is, there is only a pure voice signal, the device needs to perform gain compensation on the voice signal. The device changes the gain coefficient from the previous target value at the increase rate Vup dB/s, until the gain coefficient reaches 0 dB, and processes the signal in a manner that the gain coefficient gradually increases.

It is to be noted that, different devices may set different values or a same value for Vup, but Vup must be greater than zero. In order to improve the effect of suppression and voice enhancement, the absolute value of Vup may be set to be less than the absolute value of Vdown, thereby ensuring that acoustic feedback is suppressed in a short time, and the voice signal is restored slowly. In this case, impact of the acoustic feedback on the user can be avoided, and better voice restoration can be ensured.

In this preferred embodiment, in a case that acoustic feedback does not occurs in the signal, the gain compensation is further performed on the voice signal such that the gain after the acoustic feedback suppression processing increases to a normal level at a certain rate, thereby avoiding the problem of sudden change in the voice and poor voice quality to a certain degree.

Embodiment 3

In addition, small noises at the end of the voice are easily picked up by a receiver as a source of acoustic feedback, thereby providing a condition for acoustic feedback. In order to reduce the probability of acoustic feedback, a preferred embodiment is provided according to the present disclosure. In this preferred embodiment, a small signal attenuation method is additionally provided on the basis of the above embodiment 2, in order to attenuate a noise portion of the signal, thereby avoiding acoustic feedback caused by the noise portion.

Figure 4:
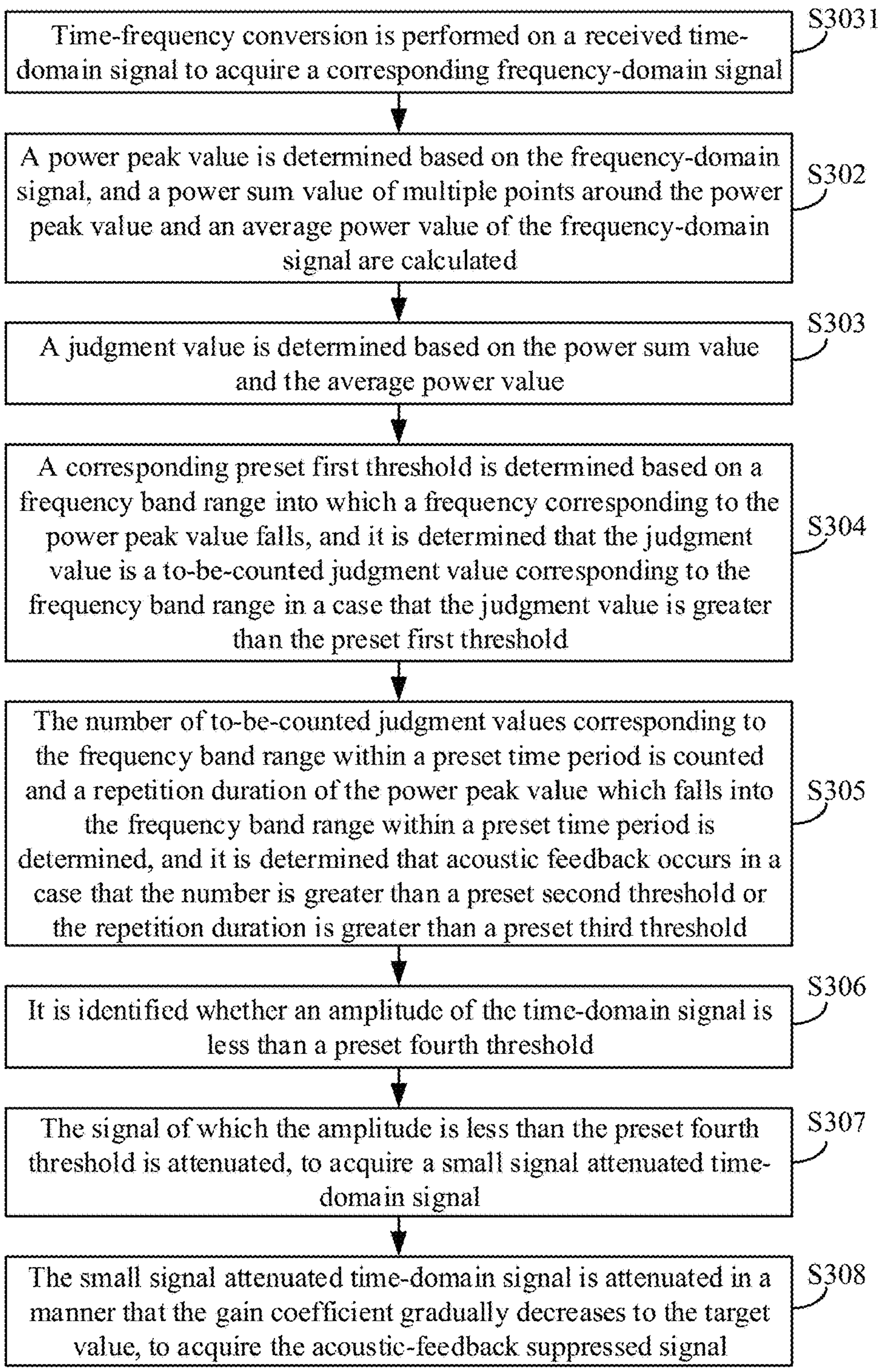
FIG. 4 is a flow chart of an acoustic feedback detection method embodiment 3 according to the present disclosure.

Reference is made to FIG. 4, which illustrates a flow chart of an acoustic feedback detection method embodiment 3 according to the present disclosure. In this method, a small signal attenuation processing is additionally provided on the basis of the above embodiment 2, in order to attenuate small noises and avoid acoustic feedback caused by the small noises. The method includes the following steps S301 to S308.

In step S301, time-frequency conversion is performed on a received time-domain signal to acquire a corresponding frequency-domain signal.

In step S302, a power peak value is determined based on the frequency-domain signal, and a power sum value of multiple points around the power peak value and an average power value of the frequency-domain signal are calculated.

In step S303, a judgment value is determined based on the power sum value and the average power value.

In step S304, a corresponding preset first threshold is determined based on a frequency band range into which a frequency corresponding to the power peak value falls, and it is determined that the judgment value is a to-be-counted judgment value corresponding to the frequency band range in a case that the judgment value is greater than the preset first threshold.

In step S305, the number of to-be-counted judgment values corresponding to the frequency band range within a preset time period is counted and a repetition duration of the power peak value which falls into the frequency band range within a preset time period is determined, and it is determined that acoustic feedback occurs in a case that the number is greater than a preset second threshold or the repetition duration is greater than a preset third threshold.

Steps S301 to S305 are the same as steps S101 to S105 described in the above embodiment 1, and are not repeated here.

In step S306, it is identified whether an amplitude of the time-domain signal is less than a preset fourth threshold.

In step S307, the signal of which the amplitude is less than the preset fourth threshold is attenuated, to acquire a small signal attenuated time-domain signal.

Specifically, step S306 and step S307 can be implemented through the following equation set:

$$\left\{\begin{matrix} y = k * x - \text{threshold} & x < \text{threshold} \\ y = x & x >= \text{threshold} \end{matrix}\right\},$$

where x in the equation is the received time-domain signal, y is the small signal attenuated time-domain signal, threshold is the preset fourth threshold, k is set based on the gain condition of the device. The above equation can be understood as: in a case that the amplitude of the time-domain signal is less than the preset fourth threshold, the signal is processed in accordance with the equation in the first row of the equation set, and in a case that the amplitude of the time-domain signal is greater than or equal to the preset fourth threshold, the signal is processed in accordance with the equation in the second row of the equation set, that is, the original signal is kept unchanged.

It is to be noted that the purpose of the preset fourth threshold is to minimize the effect of the attenuation process on the voice signal, such that the energy of the voice signal is substantially concentrated above the threshold, thereby reducing the attenuation of the voice signal and attenuating only the small signal, thus the probability of acoustic feedback can be reduced to a certain extent while ensuring the quality of the voice signal.

In step S308, the small signal attenuated time-domain signal is attenuated in a manner that the gain coefficient gradually decreases to the target value, to acquire the acoustic-feedback suppressed signal.

It is to be noted that, there is no strict execution order requirement among the steps S301 to S308 of the present embodiment. In specific implementation, steps S301 to S308 may be executed in the order shown in FIG. 3. Alternatively, when steps S301 to S305 are executed sequentially, steps S306 to S307 may be sequentially executed simultaneously, and S308 is finally executed. Of course, other execution orders can also be adopted to implement the present disclosure.

In this preferred embodiment, the amplitude of the signal is identified to determine whether the signal is a small noise, and in a case that the signal is a small noise, the signal is attenuated, thereby eliminating the small noise, thus acoustic feedback introduced by the small noise can be avoided.

Embodiment 4

Corresponding to the above embodiments 1 to 3, an acoustic feedback detection device is further provided according to the present disclosure. The device is applicable to a wireless communication device such as an interphone and a mobile phone.

Figure 5:
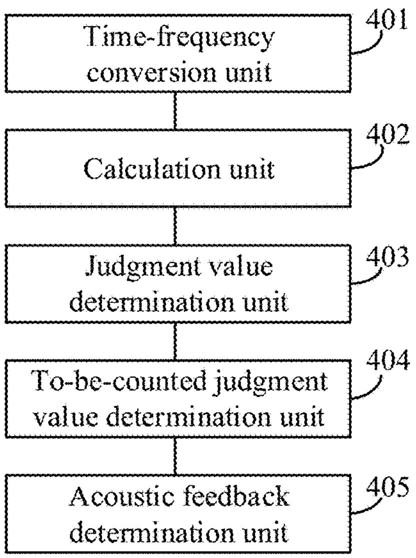
FIG. 5 is a schematic diagram of an acoustic feedback detection device embodiment 1 according to the present disclosure.

Referring to FIG. 5, which illustrates a schematic diagram of an acoustic feedback detection device embodiment 1 according to the present disclosure, the device may include a time-frequency conversion unit 401, a calculation unit 402, a judgment value determination unit 403, a to-be-counted judgment value determination unit 404 and an acoustic feedback determination unit 405.

The time-frequency conversion unit 401 is configured to perform time-frequency conversion on a received time-domain signal to acquire a corresponding frequency-domain signal.

The calculation unit 402 is configured to determine a power peak value based on the frequency-domain signal, and calculate a power sum value of multiple points around the power peak value and an average power value of the frequency-domain signal.

The judgment value determination unit 403 is configured to determine a judgment value based on the power sum value and the average power value.

The to-be-counted judgment value determination unit 404 is configured to determine a corresponding preset first threshold based on a frequency band range into which a frequency corresponding to the power peak value falls, and determine that the judgment value is a to-be-counted judgment value corresponding to the frequency band range in a case that the judgment value is greater than the preset first threshold.

The acoustic feedback determination unit 405 is configured to count the number of to-be-counted judgment values corresponding to the frequency band range within a preset time period and determine a repetition duration of the power peak value which falls into the frequency band range within a preset time period; and determine that acoustic feedback occurs in a case that the number is greater than a preset second threshold or the repetition duration is greater than a preset third threshold.

Preferably, the judgment value determination unit may be configured to calculate a ratio between the power sum value and the average power value as the judgment value.

Preferably, the calculation unit includes a sum value calculation subunit and an average power value calculation subunit.

The sum value calculation subunit is configured to calculate a sum value of the multiple points around the power peak value according to an equation $$\text{Peak} = \sum_{j=-k}^{k} X\max(j),$$

where X max(0) is the power peak value, and X max(j) represents the multiple points around the power peak value in a case that j is not equal to 0, with k being greater than or equal to 1.

The average power value calculation subunit is configured to calculate the average power value according to an equation $$Pav = \left[\sum_{j=0}^{N/2-1} Xj - \sum_{j=-k}^{k} X\max(j)\right] \Big/ \left(\frac{N}{2} - 2k - 1\right), \text{ where } \sum_{j=0}^{N/2-1} Xj$$

represents a sum value of all power values of a power spectrum of the frequency-domain signal.

Embodiment 5

Figure 6:
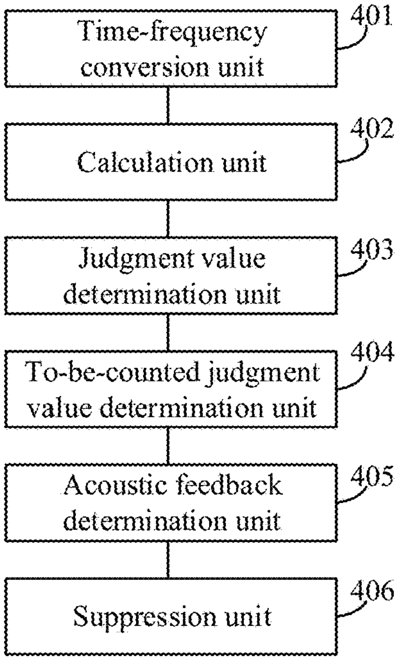
FIG. 6 is a schematic diagram of an acoustic feedback detection device embodiment 2 according to the present disclosure.

Reference is made to FIG. 6, which illustrates a schematic diagram of an acoustic feedback detection device embodiment 2 according to the present disclosure. On the basis of the above embodiment 4, the device may further include a suppression unit 406 configured to attenuate the time-domain signal in a manner that a gain coefficient gradually decreases to a target value, to acquire an acoustic-feedback suppressed signal.

Preferably, the device further includes a voice determination unit and a voice enhancement unit.

The voice determination unit is configured to calculate a maximum likelihood ratio of a voice frame based on the time-domain signal and a noise power value, and determine that the time-domain signal is a voice signal in a case that the maximum likelihood ratio is greater than a preset voice threshold.

The voice enhancement unit is configured to enhance the voice signal in a manner that a gain coefficient gradually increases to 0 dB, to acquire an enhanced signal.

Embodiment 6

Figure 7:
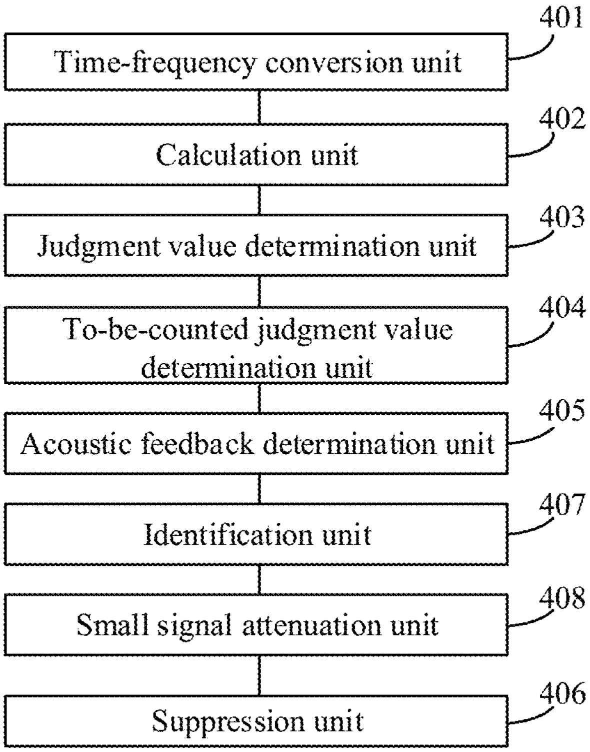
FIG. 7 is a schematic diagram of an acoustic feedback detection device embodiment 3 according to the present disclosure.

Reference is made to FIG. 7, which illustrates a schematic diagram an acoustic feedback detection device embodiment 3 according to the present disclosure. On the basis of the above embodiment 5, the device may further include an identification unit 407 and a small signal attenuation unit 408.

The identification unit 407 is configured to identify whether an amplitude of the time-domain signal is less than a preset fourth threshold.

The small signal attenuation unit 408 is configured to attenuate the signal of which the amplitude is less than the preset fourth threshold, to acquire a small signal attenuated time-domain signal.

The suppression unit is configured to attenuate the small signal attenuated time-domain signal in a manner that a gain coefficient gradually decreases to a target value, to acquire an acoustic-feedback suppressed signal.

In the present disclosure, the frequency band range in which the frequency corresponding to the power peak value falls is used as an important basis for acoustic feedback detection, where division of the frequency band range is based on the full frequency band. Therefore, it is not necessary to use the band-pass filter to detect signals, and the problem of missing of detection due to settings of the center frequency and the bandwidth of the band-pass filter can be avoided. In addition, in the present disclosure, the repetition duration of the frequency corresponding to the peak value and the number of the judgment values which meets the condition are used to determine whether the signal is an acoustic feedback signal from the perspective of the frequency characteristic of acoustic feedback, rather than determining the periodicity of the signal from the perspective of the signal waveform, and both values can be acquired by simple calculation procedures which are less error-prone, thereby avoiding the problem of false detection caused by the determination based on the waveform.

Further, a hardware configuration of the acoustic feedback detection device is provided according to the embodiments of the present disclosure. The device may include at least one processor (e.g., a CPU), at least one network interface or other communication interface, a storage, and at least one communication bus for implementing connection communication between the components. The processor is configured to execute executable modules stored in storage, such as computer programs. The storage may include a high-speed random access memory (RAM), and may also include a non-volatile memory, such as at least one magnetic disk memory. The communication connection between the system gateway and at least one other network element is implemented through the at least one network interface (which may be wired or wireless) using the internet, a wide area network, a local network, a metropolitan area network, and the like.

Figure 8:
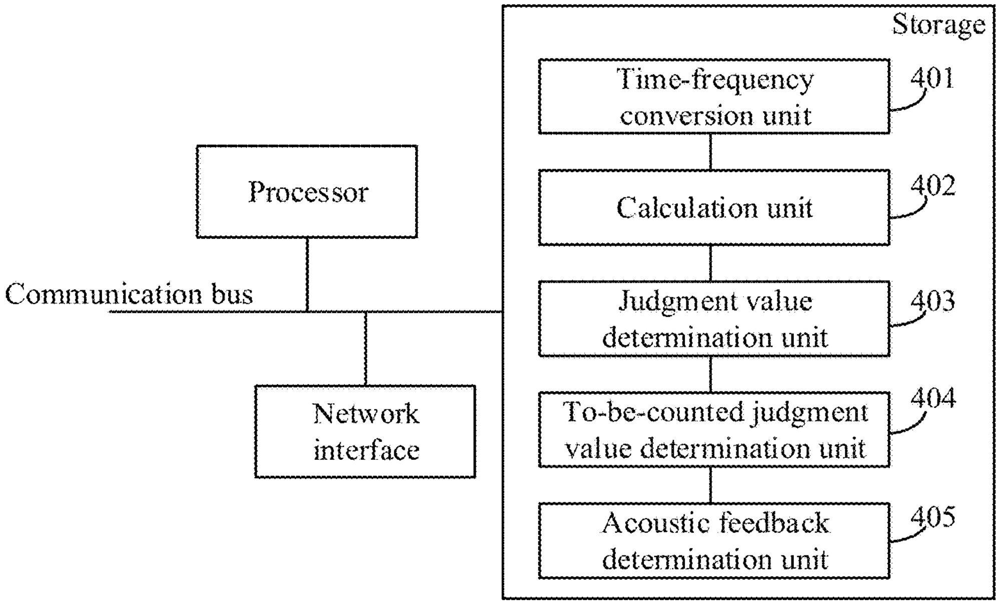
FIG. 8 is a schematic diagram of hardware configuration of the acoustic feedback detection device according to the present disclosure.

Referring to FIG. 8, in some embodiments, program instructions are stored in the storage, and may be executed by the processor, where the program instructions may include the time-frequency conversion unit 401, the calculation unit 402, the judgment value determination unit 403, the to-be-counted judgment value determination unit 404 and the acoustic feedback determination unit 405. Alternatively, the program instructions may further include the suppression unit 406, the identification unit 407, and the small signal attenuation unit 408. The specific implementations of respective units may be referred to the corresponding units disclosed in FIG. 5, 6 or 7, and is not repeated here.

It is to be noted that the acoustic feedback detection device of the present disclosure can be applied to a professional wireless communication network. The interphone is prone to acoustic feedback due to the structure of the microphone and the speaker of the interphone and the actual application environment of the interphone. Therefore, the device of the present disclosure is applicable to the interphone. Of course, the device of the present disclosure can also be applied to acoustic devices to which microphones and speakers are connected, such as public address systems and hearing aids.

According to the embodiments described above, those skilled in the art can clearly know that all or part of steps in the above method of the embodiments of the present disclosure may be implemented by means of software in conjunction with necessary general-purpose hardware. According to such understanding, essential parts or parts contributing to the conventional technology of technical solutions of the present disclosure may be embodied as a computer software product. The computer software product may be stored in a storage medium, such as, ROM/RAM, a magnetic disc, or an optical disk, and the computer software product includes multiple instructions for enabling a computer device (which may be a personal computer, a server or a network communication device such as a media gateway or the like) to perform the methods described in various embodiments or certain parts of the embodiments of the present disclosure.

It is to be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, when there is no further limitation, the element defined by the wording "include(s) a . . . " does not exclude the case that in the process, method, article or device that includes the element there are other same elements.

It is to be noted that, the embodiments in this specification are described in a progressive way, each of which emphasizes the differences from others, and the same or similar parts among the embodiments can be referred to each other. Particularly, since the device and system embodiments are substantially similar to the method embodiments, the description thereof is relatively simple, and for relevant matters references may be made to the description of the method embodiment.

The foregoing is merely preferred embodiments of the present disclosure and is not intended to limit the scope of the present disclosure. The present disclosure does not limit the number of timeslots and proportion relationships that can be supported, and any modifications, equivalent substitutions, improvements, and the like within the spirit and principles of the present disclosure are intended to be included within the scope of the present disclosure.

The invention claimed is:

1. An acoustic feedback detection method, comprising:

performing time-frequency conversion on a received time-domain signal to acquire a corresponding frequency-domain signal;

determining a power peak value based on the frequency-domain signal, and calculating a power sum value of a plurality of points around the power peak value and an average power value of the frequency-domain signal;

determining a judgment value by calculating a ratio between the power sum value and the average power value;

determining a corresponding preset first threshold based on a frequency band range into which a frequency corresponding to the power peak value falls, and determining that the judgment value is a to-be-counted judgment value corresponding to the frequency band range in a case that the judgment value is greater than the preset first threshold;

counting the number of to-be-counted judgment values corresponding to the frequency band range within a preset time period and determining a repetition duration of the power peak value which falls into the frequency band range within a preset time period, and determining that acoustic feedback occurs in a case that the number is greater than a preset second threshold or the repetition duration is greater than a preset third threshold;

identifying whether an amplitude of the time-domain signal is less than a preset fourth threshold; wherein the preset fourth threshold is a value for differentiating a small signal of noise and a voice signal; and attenuating the signal of which the amplitude is less than the preset fourth threshold, to acquire a small signal attenuated time-domain signal.

2. The method according to claim 1, wherein after determining that the acoustic feedback occurs, the method further comprises:

attenuating the time-domain signal in a manner that a gain coefficient gradually decreases to a target value, to acquire an acoustic-feedback suppressed signal.

3. The method according to claim 2, wherein attenuating the time-domain signal in a manner that a gain coefficient gradually decreases to a target value, to acquire an acoustic-feedback suppressed signal comprises:

attenuating the small signal attenuated time-domain signal in a manner that the gain coefficient gradually decreases to the target value, to acquire the acoustic-feedback suppressed signal.

4. The method according to claim 1, wherein it is determined that acoustic feedback does not occur in a case that the number is less than or equal to the preset second threshold and the repetition duration is less than or equal to the preset third threshold, and the method further comprises:

calculating a maximum likelihood ratio of a voice frame based on the time-domain signal and a noise power value, and determining that the time-domain signal is a voice signal in a case that the maximum likelihood ratio is greater than a preset voice threshold; and enhancing the voice signal in a manner that a gain coefficient gradually increases to 0 dB, to acquire an enhanced signal.

5. The method according to claim 1, wherein the determining the power peak value based on the frequency-domain signal, and calculating the power sum value of the plurality of points around the power peak value and the average power value of the frequency-domain signal comprises:

calculating a sum value of the plurality of points around the power peak value according to an equation $$\text{Peak} = \sum_{j=-k}^{k} X\max(j),$$

wherein X max(0) is the power peak value, and X max(j) represents the plurality of points around the power peak value in a case that j is not equal to 0, with k being greater than or equal to 1; and calculating the average power value according to an equation $$Pav = \left[\sum_{j=0}^{N/2-1} Xj - \sum_{j=-k}^{k} X\max(j)\right] \Big/ \left(\frac{N}{2} - 2k - 1\right), \text{ where } \sum_{j=0}^{N/2-1} Xj$$

represents a sum value of all power values of a power spectrum of the frequency-domain signal.

6. An acoustic feedback detection device, comprising:

a time-frequency conversion unit, configured to perform time-frequency conversion on a received time-domain signal to acquire a corresponding frequency-domain signal;

a calculation unit, configured to determine a power peak value based on the frequency-domain signal, and calculate a power sum value of a plurality of points around the power peak value and an average power value of the frequency-domain signal;

a judgment value determination unit, configured to determine a judgment value by calculating a ratio between the power sum value and the average power value;

a to-be-counted judgment value determination unit, configured to determine a corresponding preset first threshold based on a frequency band range into which a frequency corresponding to the power peak value falls, and determine that the judgment value is a to-be-counted judgment value corresponding to the frequency band range in a case that the judgment value is greater than the preset first threshold;

an acoustic feedback determination unit, configured to count the number of to-be-counted judgment values corresponding to the frequency band range within a preset time period and determine a repetition duration of the power peak value which falls into the frequency band range within a preset time period; and determine that acoustic feedback occurs in a case that the number is greater than a preset second threshold or the repetition duration is greater than a preset third threshold;

an identification unit, configured to identify whether an amplitude of the time-domain signal is less than a preset fourth threshold; wherein the preset fourth threshold is a value for differentiating a small signal of noise and a voice signal; and a small signal attenuation unit, configured to attenuate the signal of which the amplitude is less than the preset fourth threshold, to acquire a small signal attenuated time-domain signal.

7. The device according to claim 6, further comprising:

a suppression unit, configured to attenuate the time-domain signal in a manner that a gain coefficient gradually decreases to a target value, to acquire an acoustic-feedback suppressed signal.

8. The device according to claim 7, a wherein the suppression unit is further configured to attenuate the small signal attenuated time-domain signal in a manner that a gain coefficient gradually decreases to a target value, to acquire an acoustic-feedback suppressed signal.

9. The device according to claim 6, further comprising:

a voice determination unit, configured to calculate a maximum likelihood ratio of a voice frame based on the time-domain signal and a noise power value, and determine that the time-domain signal is a voice signal in a case that the maximum likelihood ratio is greater than a preset voice threshold; and a voice enhancement unit, configured to enhance the voice signal in a manner that a gain coefficient gradually increases to 0 dB, to acquire an enhanced signal.

10. An acoustic feedback detection device, comprising at least one processor, at least one network interface or other communication interface, a storage and at least one communication bus, wherein the storage is configured to store program instructions, and the processor is configured to, according to the program instructions:

perform time-frequency conversion on a received time-domain signal to acquire a corresponding frequency-domain signal;

determine a power peak value based on the frequency-domain signal, and calculate a power sum value of a plurality of points around the power peak value and an average power value of the frequency-domain signal;

determine a judgment value by calculating a ratio between based on the power sum value and the average power value;

determine a corresponding preset first threshold based on a frequency band range into which a frequency corresponding to the power peak value falls, and determine that the judgment value is a to-be-counted judgment value corresponding to the frequency band range in a case that the judgment value is greater than the preset first threshold;

count the number of to-be-counted judgment values corresponding to the frequency band range within a preset time period and determine a repetition duration of the power peak value which falls into the frequency band range within a preset time period; and determine that acoustic feedback occurs in a case that the number is greater than a preset second threshold or the repetition duration is greater than a preset third threshold;

identify whether an amplitude of the time-domain signal is less than a preset fourth threshold; wherein the preset fourth threshold is a value for differentiating a small signal of noise and a voice signal; and attenuate the signal of which the amplitude is less than the preset fourth threshold, to acquire a small signal attenuated time-domain signal.

11. The device according to claim 10, wherein the processor is further configured to, according to the program instructions:

attenuate the time-domain signal in a manner that a gain coefficient gradually decreases to a target value, to acquire an acoustic-feedback suppressed signal.

12. The method according to claim 2, wherein it is determined that acoustic feedback does not occur in a case that the number is less than or equal to the preset second threshold and the repetition duration is less than or equal to the preset third threshold, and the method further comprises:

calculating a maximum likelihood ratio of a voice frame based on the time-domain signal and a noise power value, and determining that the time-domain signal is a voice signal in a case that the maximum likelihood ratio is greater than a preset voice threshold; and enhancing the voice signal in a manner that a gain coefficient gradually increases to 0 dB, to acquire an enhanced signal.

13. The method according to claim 3, wherein it is determined that acoustic feedback does not occur in a case that the number is less than or equal to the preset second threshold and the repetition duration is less than or equal to the preset third threshold, and the method further comprises:

calculating a maximum likelihood ratio of a voice frame based on the time-domain signal and a noise power value, and determining that the time-domain signal is a voice signal in a case that the maximum likelihood ratio is greater than a preset voice threshold; and enhancing the voice signal in a manner that a gain coefficient gradually increases to 0 dB, to acquire an enhanced signal.

14. The method according to claim 2, wherein the determining the power peak value based on the frequency-domain signal, and calculating the power sum value of the plurality of points around the power peak value and the average power value of the frequency-domain signal comprises:

calculating a sum value of the plurality of points around the power peak value according to an equation $$\text{Peak} = \sum_{j=-k}^{k} X\max(j),$$

wherein X max(0) is the power peak value, and X max(j) represents the plurality of points around the power peak value in a case that j is not equal to 0, with k being greater than or equal to 1; and calculating the average power value according to an equation $$Pav = \left[\sum_{j=0}^{N/2-1} Xj - \sum_{j=-k}^{k} X\max(j)\right] \Big/ \left(\frac{N}{2} - 2k - 1\right), \text{ where } \sum_{j=0}^{N/2-1} Xj$$

represents a sum value of all power values of a power spectrum of the frequency-domain signal.

15. The method according to claim 3, wherein the determining the power peak value based on the frequency-domain signal, and calculating the power sum value of the plurality of points around the power peak value and the average power value of the frequency-domain signal comprises:

calculating a sum value of the plurality of points around the power peak value according to an equation $$\text{Peak} = \sum_{j=-k}^{k} X\max(j),$$

wherein X max(0) is the power peak value, and X max(j) represents the plurality of points around the power peak value in a case that j is not equal to 0, with k being greater than or equal to 1; and calculating the average power value according to an equation $$Pav = \left[\sum_{j=0}^{N/2-1} Xj - \sum_{j=-k}^{k} X\max(j)\right] \Big/ \left(\frac{N}{2} - 2k - 1\right), \text{ where } \sum_{j=0}^{N/2-1} Xj$$

represents a sum value of all power values of a power spectrum of the frequency-domain signal.

16. The device according to claim 7, further comprising:

a voice determination unit, configured to calculate a maximum likelihood ratio of a voice frame based on the time-domain signal and a noise power value, and determine that the time-domain signal is a voice signal in a case that the maximum likelihood ratio is greater than a preset voice threshold; and a voice enhancement unit, configured to enhance the voice signal in a manner that a gain coefficient gradually increases to 0 dB, to acquire an enhanced signal.

17. The device according to claim 8, further comprising:

a voice determination unit, configured to calculate a maximum likelihood ratio of a voice frame based on the time-domain signal and a noise power value, and determine that the time-domain signal is a voice signal in a case that the maximum likelihood ratio is greater than a preset voice threshold; and a voice enhancement unit, configured to enhance the voice signal in a manner that a gain coefficient gradually increases to 0 dB, to acquire an enhanced signal.

* * * * *